(12) United States Patent
Mehlo et al.

(10) Patent No.: US 12,312,037 B2
(45) Date of Patent: May 27, 2025

(54) HOLDING DEVICE FOR RELEASABLY HOLDING A BICYCLE ACCUMULATOR ON A BICYCLE FRAME

(71) Applicant: Robert Bosch GmbH, Stuttgart (DE)

(72) Inventors: Dennis Mehlo, Taipei (TW); Lisa Bayer, Stuttgart (DE); Peter Kunert, Lichtenstein (DE); Wolf Zahn, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 670 days.

(21) Appl. No.: 17/633,708

(22) PCT Filed: Sep. 2, 2020

(86) PCT No.: PCT/EP2020/074416
§ 371 (c)(1),
(2) Date: Feb. 8, 2022

(87) PCT Pub. No.: WO2021/043796
PCT Pub. Date: Mar. 11, 2021

(65) Prior Publication Data
US 2022/0315158 A1 Oct. 6, 2022

(30) Foreign Application Priority Data
Sep. 4, 2019 (DE) .................... 10 2019 213 437.8

(51) Int. Cl.
*B62J 43/20* (2020.01)
*B62M 6/90* (2010.01)
*B62K 19/40* (2006.01)

(52) U.S. Cl.
CPC ................ *B62J 43/20* (2020.02); *B62M 6/90* (2013.01); *B62K 19/40* (2013.01)

(58) Field of Classification Search
CPC ....................................................... B62J 43/20
See application file for complete search history.

(56) References Cited

U.S. PATENT DOCUMENTS

| 12,097,921 B2 * | 9/2024 | Kunert ..................... B62J 43/13 |
| 2016/0254506 A1 | 9/2016 | Nishihara et al. |

(Continued)

FOREIGN PATENT DOCUMENTS

| CN | 2808638 Y | 8/2006 |
| CN | 108706063 A | 10/2018 |

(Continued)

OTHER PUBLICATIONS

Machine Translation of CN 109941382 (Year: 2019).*
International Search Report for PCT/EP2020/074416, Issued Nov. 24, 2020.

*Primary Examiner* — Kevin Hurley
(74) *Attorney, Agent, or Firm* — NORTON ROSE FULBRIGHT US LLP (57) ABSTRACT

A holding device for releasably holding an accumulator, in particular a bicycle accumulator, on a frame, especially a bicycle frame, and includes at least a carrier unit provided with at least a carrier element, especially a guide rail, for the at least partial accommodation and/or guidance of the accumulator. The holding device has at least a variation unit situated at least partially on the carrier element for the variable positioning of a locking unit at different positions of the carrier element, in particular viewed along a longitudinal axis of the carrier element.

13 Claims, 10 Drawing Sheets

(56) References Cited

U.S. PATENT DOCUMENTS

2018/0241022 A1  8/2018  Nishihara et al.
2022/0289336 A1* 9/2022  Philipzik ................ B62K 19/40

FOREIGN PATENT DOCUMENTS

| CN | 109941382   A  | 6/2019 |
| DE | 102016001325 A1 | 9/2016 |
| DE | 202016104156 U1 | 9/2016 |
| DE | 102016213903 B3 | 1/2018 |
| TW | M547523    U  | 8/2017 |

* cited by examiner

Fig. 10

HOLDING DEVICE FOR RELEASABLY HOLDING A BICYCLE ACCUMULATOR ON A BICYCLE FRAME

BACKGROUND INFORMATION

A holding device for releasably holding an accumulator, in particular a bicycle accumulator, on a frame, especially a bicycle frame, is described in German Patent Application Nos. DE 10 2016 213 903 B3 and DE 20 2016 104 156 U1; this holding device has at least one carrier unit with at least one carrier element for the at least partial accommodation and/or guidance of the accumulator. In the conventional holding devices, a locking unit is firmly fixed in position relative to the carrier unit and invariable in its position relative to the carrier element.

SUMMARY

The present invention starts out from a holding device for releasably holding an accumulator, in particular a bicycle accumulator, on a frame, especially a bicycle frame, and at least includes a carrier unit provided with at least a carrier element, especially a guide rail, for the at least partial accommodation and/or guidance of the accumulator.

In accordance with an example embodiment of the present invention, it is provided that the holding device at least includes a variation unit situated at least partially on the carrier element for the variable positioning of a locking unit in different positions of the carrier element, in particular viewed along a longitudinal axis of the carrier element. Because of the development of the holding device according to the present invention, great flexibility is achievable in the installation of an accumulator on the holding device. More particularly, a comfortable radial and/or axial installation and/or deinstallation of an accumulator may be realized.

The holding device is preferably developed as a bicycle accumulator holding device. More particularly, the holding device is provided to allow for an at least temporary positioning of an accumulator in and/or on a bicycle. In particular, the accumulator is easy to install in the holding device or to be uninstalled from the holding device, preferably without the use of tools. The holding device is particularly provided to be fixed in place on a bicycle frame, preferably in a bicycle frame, e.g., in a top tube, a seat tube, a head tube, or preferably, a down tube of the bicycle frame. For the fixation in or on a bicycle frame, the holding device particularly includes fastening elements, e.g., screw, plug or latch elements. As an alternative or in addition, it is possible that the holding device, preferably the carrier unit or the carrier element, are at least partially developed in one piece with the bicycle frame or that at least part of the holding device, preferably the carrier unit or the carrier element, is integrally connected to the bicycle frame, especially welded or bonded.

In accordance with an example embodiment of the present invention, the variation unit is preferably provided to fix the locking unit in place in different positions on the carrier element. The variation unit preferably fixates the locking unit on the carrier element in at least one direction. The variation unit preferably holds the locking unit in place on the carrier element in a fixed position. Most preferably, the variation unit fixates the locking unit on the carrier element so that it is unable to rotate or change position. The variation unit particularly is provided to position locking units of different designs on the carrier element. It is possible that the variation unit has multiple positions for positioning the locking unit. The variation unit preferably has at least one element which is provided for the form-locked and/or force-locked connection to the locking unit and/or to the carrier element in order to position at least the locking unit on the carrier element in a manner that makes the position variable. The element of the variation unit may be embodied as a form-lock recess, a clamping element, a latch element, or as some other element considered useful by one skilled in the art. The variation unit is preferably provided to interact with a form-lock element, e.g., a latch element or the like, which is firmly or movably situated on a base body of the locking unit. The variation unit is preferably embodied in such a way that the locking unit and/or a stop unit of the holding device is/are able to be positioned at different positions on the carrier element.

In particular, the locking unit is provided to hold the accumulator in position on the carrier unit. It is possible that the locking unit is fastened to the carrier element. It is also possible that the locking unit is firmly connected to the accumulator. The locking unit preferably fixates the accumulator on the carrier element in at least one direction. The locking unit preferably fixates the accumulator on the variation unit situated on the carrier element in a fixed position. Especially preferably, the locking unit fixes the accumulator in position on the carrier element in a manner that allows no rotation and/or change in position.

The variation unit may be embodied as a latching unit, a clamping unit, a screw unit, a rail slide unit or as some other unit considered useful by one skilled in the art (i.e., in view of the disclosure herein) and provided to position at least the locking unit on the carrier unit in variable positions with the aid of a form-locked and/or force-locked connection. At least part of the variation unit is preferably situated on the carrier element and in particular developed in one part with the carrier element. It is also possible that the variation unit is at least partially situated on the locking unit. In one embodiment of the variation unit as a rail slide unit, the variation unit preferably includes at least one rail slide, which is movably mounted on the carrier element along a longitudinal axis of the carrier element. Especially preferably, the variation unit embodied as a rail slide has at least one latch element which is situated on the rail slide and is spring-loaded. For instance, the latch element is developed as a pin or the like. It is also possible that the variation unit embodied as a rail slide, which has at least one screw connection element or clamping element that is situated on the rail slide. Especially in certain positions of the rail slide on the carrier element, the latch element disposed on the rail slide is able to engage with corresponding form-lock elements, in particular latch recesses, of the variation unit. More particularly, the variation unit embodied as a rail slide has an operating unit, which is provided to release the latch element from a latched state when the operating unit is operated.

In accordance with an example embodiment of the present invention, it is furthermore provided that the variation unit has at least two form-lock elements for the variable placement of the locking unit at different positions of the carrier element, especially viewed along a longitudinal axis of the carrier element. In an advantageous manner, this makes it possible to realize a simple and compact holding device. In a particularly advantageous manner, the embodiment according to the present embodiment allows the locking element to be placed at different positions. In particular, the form-lock elements of the variation unit are provided for the positioning of the locking unit. More particularly, the form-lock elements are provided to establish a form-locked connection with at least part of the locking unit in an operating state. The form-lock elements particularly create form-lock recesses, which are provided to accommodate part of the locking unit, in particular form-lock fit elements of the locking unit, in order to establish a form-locked connection. The form-lock elements are preferably embodied as recesses or depressions in the variation unit, in particular recesses or depressions situated on the carrier element. Especially preferably, the form-lock elements of the variation unit are embodied as polygonal, in particular rectangular, recesses. It is also possible that the form-lock elements of the variation unit are developed as elongated holes, as round, oval or elliptical recesses or depressions, or as other recesses or depressions considered useful by one skilled in the art. It is also possible that the form-lock elements of the variation unit are developed as recesses having different forms. In particular, the form-lock elements may be situated on any side, e.g., a right side, a left side, a topside or a bottom side, of the carrier element or the frame viewed relative to a setup direction of the frame, in particular the bicycle frame.

It is furthermore provided that the at least two form-lock elements are situated at different distances from a stop unit of the holding device disposed in particular at one end of the carrier element along a longitudinal axis of the carrier element. This advantageously makes it possible to provide a holding device that allows for the installation of accumulators of different lengths. In a particularly advantageous manner, the embodiment according to the present invention makes it possible to realize a compact holding device. The stop unit is especially provided to restrict at least an axial movement of the accumulator relative to the carrier unit in an installation or insertion direction during the installation and/or in an operating state. The stop element is preferably connected to the carrier unit, in particular to the carrier element of the carrier unit, in a force-locked, form-locked and/or an integral fashion. In an operating state when the accumulator is situated on the carrier element, the accumulator is particularly clamped, especially wedged and/or latched, between the locking unit and the stop unit. The accumulator is preferably clamped between the stop unit and the locking unit in such a way that the locking unit exerts a pressure force on the accumulator in the clamped operating state, which acts in the direction of the stop unit, in particular parallel to a longitudinal axis of the carrier element. As an alternative or in addition, it is possible that the holding device includes an adapter element, which is provided to be clamped between the stop element and the accumulator. The adapter element is preferably through-contacted so that an electrical connection between the accumulator and the stop element is ensured.

In accordance with an example embodiment of the present invention, in addition, it is provided that the holding device includes the locking unit, in particular the already mentioned locking unit, which is situated on the carrier unit in a variable manner with the aid of the variation unit, the locking unit being provided to releasably fasten the accumulator to the carrier unit. More particularly, it is possible that the locking unit is fastened to the variation unit of the carrier element and the accumulator is clamped, in particular wedged and/or latched, between the stop unit and the locking unit by sliding the accumulator in the radial direction. However, it is also possible that the locking unit is firmly situated on the accumulator and the locking unit is positioned in one step on the variation unit for the releasable holding of the accumulator on a frame, in particular on a bicycle frame.

it is furthermore provided that the holding device includes an accumulator, in particular the above-mentioned accumulator, and the accumulator has the locking unit for the releasable fastening of the accumulator to the variation unit disposed on the carrier element. This advantageously makes it possible to realize an axial installation on the holding device and a deinstallation from the accumulator. In an especially advantageous manner, the holding device according to the present invention allows for the releasable holding of accumulators of different lengths. The locking unit is preferably situated on a side of the accumulator, in particular on the side of the accumulator situated opposite the side of the accumulator facing the stop unit. The locking unit preferably has a clamping unit, which is provided to fix the accumulator in position on the carrier unit in a clamped operating state, and to clamp, in particular wedge and/or latch, the accumulator between the locking unit and the stop unit in an operating position in such a way that the clamping unit exerts a pressure force on the accumulator in the clamped operating state, the pressure force acting in the direction of the stop unit, in particular parallel to a longitudinal axis of the carrier element. A 'clamped operating state' particularly describes a state of the holding device in which the clamping unit is clamped, in which the accumulator is fixed in position in the holding device, and/or in which the accumulator is in the operating position, that is to say, in which an energy output of the accumulator is enabled, e.g., to the auxiliary motor, in particular. It is possible that the clamping unit is equipped with an operating element which, especially apart from a key for operating a lock, is designed to be operable without tools. This advantageously allows for an especially simple installation, in particular an especially simple deinstallation or an especially simple exchange of the accumulator. More particularly, the clamping unit is operable purely by hand via the operating element. In an advantageous manner, this achieves an especially high user friendliness. An 'operating element' should particularly be understood as an element which has a control panel for adjusting the operating state, in particular the clamped operating state and the unclamped operating state, of the clamping unit by an operator. More specifically, the operating element is embodied as a lever, e.g., a toggle lever, a pull lever, or as a pivot lever or a button, such as a key or a push button. In an advantageous manner, simple ergonomics are achievable especially when the operating element is developed as a toggle lever, in particular since an operating direction of the toggle lever in this case overlaps with an insertion direction of the accumulator into the holding device predefined by the carrier element. More particularly, it is possible that the clamping unit has a knee lever, the operating element preferably forming at least one part of the knee lever, in particular a leg. The use of a knee lever advantageously makes it possible to achieve a high clamping force in a manual operation at an essentially constant force expenditure by the operator during the clamping process. More specifically, an operating force for operating the operating element is at least essentially constant or linear, while the pressure force generated by a clamping element of the knee lever, which particularly forms a further leg of the knee lever, rises or falls exponentially. In addition, a knee lever advantageously makes it possible for the operating element to be mounted in an essentially force-free manner in the clamped state because the pressure force acts in particular at another leg of the knee lever. A long service life of the clamping unit is advantageously achievable in this way. As an alternative or in addition to a knee lever, the clamping unit may have as a clamping mechanism a twist lock, a threaded coupling, a bayonet lock or the like. In particular, the operating element simultaneously forms a grip element which is provided at least to make the removal of the accumulator easier. More particularly, the grip element is embodied as a pull tab. The pull tab can advantageously be grabbed by the hand of an operator and be used for pulling the accumulator out of the holding device. Especially preferably, the clamping unit has a clamping element, which is provided to support at least a large portion of the pressure force that occurs on the carrier element or the frame in the clamped operating state. This advantageously makes it possible to achieve a secure holding of the accumulator. In particular, given a shorter distance perpendicular to a medium force direction of a point of application of the clamping force on the accumulator from a point of application of the clamping force on the carrier element, higher forces are able to be absorbed by the clamping unit. More particularly, the clamping element forms at least a part, in particular a leg, of the knee lever, which preferably differs from the operating element. The clamping element is especially connected to the operating element via a hinge. As an alternative, however, it is also possible that the clamping unit has only a simple toggle lever without a knee lever geometry. The operating element may particularly also be developed in one piece with the clamping element. More specifically, the clamping element is provided to dig into a part of the carrier unit or into a part of the frame during the clamping process in order to generate the pressure force. It is possible that the locking unit is fasted to the carrier element with the aid of a clamping unit as described earlier, so that an accumulator slipped radially between the locking unit and the stop unit may be clamped between the locking unit and the stop unit, e.g., using latch elements or clamping elements which are situated on the locking unit. It is also possible that the locking unit is screw-fitted to the carrier unit.

It is furthermore provided that the carrier element has at least one side wall, which is curved or angled relative to a main extension plane of the carrier element and at least partially covers the accumulator laterally, at least in a state when it is situated on the carrier element. In an alternative embodiment, in order to achieve a task according to the present invention, it is possible that the holding device is developed independently of the variation unit. In the alternative embodiment, in particular in the embodiment developed independently of the variation unit, the holding device includes at least the carrier unit, which has at least one carrier element, in particular a guide rail, for an at least partial accommodation and/or guidance of the accumulator, the carrier element having at least one side wall, which is curved or angled relative to a main extension plane of the carrier element and at least partly covers the accumulator laterally, at least in a state when it is situated on the carrier unit. This advantageously makes it possible to achieve an at least partial guidance of the accumulator. More particularly, the side walls partly guide the accumulator at least during an installation. In particular, the side walls at least partially support the accumulator in an operating state. It is possible that the side wall has a slide element. This advantageously makes it possible to largely avoid damage such as scratching of the accumulator and/or the carrier element. It is also possible that the side wall has a plurality of slide elements. For example, the slide element may be embodied as a slide roller or as a slide film. The expression 'laterally covered' particularly is meant to denote that an imaginary axis perpendicular to an outer wall of the accumulator intersects with the side wall and also the outer wall of the accumulator, a maximum extension of the side wall preferably being smaller than a maximum extension of the outer wall of the accumulator, in particular along a direction extending perpendicular to the longitudinal axis of the carrier element and parallel to the outer wall of the accumulator. Especially preferably, the side wall is developed in one piece with the carrier element. Most preferably, the side wall is situated on the carrier element in such a way that a main extension direction of the side wall extends parallel to the longitudinal axis of the carrier element. It is possible that a maximum length of the side wall, especially along the main extension direction of the side wall, corresponds to the maximum length of the carrier element, especially along the longitudinal axis of the carrier element. A 'main extension direction' of a component particularly is to be understood as a direction that extends parallel to the longest edge of the smallest geometrical cuboid that just barely still fully encloses the object. A 'main extension plane' of a component particularly describes a plane that is parallel to the largest side area of the smallest possible imaginary cuboid that just barely still fully encloses the component and particularly extends through the center point of the cuboid. The side wall of the carrier element preferably forms an angle of especially less than 180°, preferably of less than 120° and most preferably, of more than 90°, with the main extension plane of the carrier element. It is also possible that the side wall laterally fully covers the accumulator.

It is furthermore provided that the carrier element has at least one side wall, which is curved or angled relative to a main extension plane of the carrier element, and at least one further side wall, which is curved or angled relative to the main extension plane of the carrier element, the variation unit being situated at least in a region between the side wall and the further side wall. A bilateral guidance, in particular during an installation and/or deinstallation, of the accumulator is achievable in this way. In a placement on the carrier element, the locking unit is preferably at least partially guided by the side wall and/or the further side wall. More specifically, the side wall and the further side wall make it possible at least to partially support the accumulator in an operating state. The side walls are particularly able to protect the accumulator from damage. It is possible that the locking unit is at least partially supported by the side wall and the further side wall. Great stability of the holding device is advantageously achievable in this manner. It is possible that the further side wall has a slide element. In this way, damage, e.g., scratching of the accumulator and/or of the carrier element, is largely preventable in an advantageous manner. It is also possible that the further side wall has a plurality of slide elements. The further side wall is particularly developed in one piece with the carrier element. The further side wall is preferably positioned on the carrier element in such a way that a main extension direction of the further side wall extends parallel to the longitudinal axis of the carrier element. It is possible that a maximum length of the further side wall, in particular along the main extension direction of the further side wall, corresponds to the maximum length of the carrier element, in particular along the longitudinal axis of the carrier element. The further side wall of the carrier element preferably forms an angle of especially less than 180°, preferably of less than 120°, and most preferably, of more than 90°, with the main extension plane of the carrier element. In particular, the side wall and the further side wall are situated in such a way that the main extension directions of the side wall and the further side wall are parallel with one another. It is possible that the side wall and the further side wall have identical dimensions. it is also possible that the side wall and the further side wall have different dimensions. It is possible that the angles, in particular the amounts of the angles, under which the side wall and the further side wall are angled in relation to at least the main extension direction of the carrier element, in particular the amount of the angles, are identical. It is also possible that the angles, in particular the amounts of the angles, under which the side wall and the further side wall are angled at least in relation to the main extension plane of the carrier element, are different. It is also possible that the accumulator is laterally fully covered by the further side wall.

In addition, it is provided that the carrier element has at least one side wall, in particular the above-mentioned side wall, which is angled or curved relative to a main extension plane of the carrier element, and at least one further side wall, in particular the above-mentioned side wall, which is curved or angled relative to the main extension plane of the carrier element, the variation unit being at least partially situated on the side wall and/or on the further side wall. This advantageously makes it possible to improve the holding strength of the holding device. It is possible that the side wall and/or the further side wall has/have form-lock elements. This advantageously achieves great stability of the holding device. In an advantageous manner, the variability of the positioning of the locking unit on the carrier element is able to be increased. It is possible that the side wall and/or the further side wall has/have a form-lock element or a plurality of form-lock elements of the variation unit. It is possible that the form-lock elements of the side wall and/or the further side wall are provided for the positioning of the locking unit. More particularly, the form-lock elements of the side wall and/or the further side wall are able to establish a form lock with at least a part of the locking unit in an operating state. The form-lock elements of the side wall and/or the further side wall preferably create form-lock recesses, which are provided to accommodate part of the locking unit, in particular form-lock fit elements of the locking unit, for the purpose of establishing a form-locked connection. The form-lock elements are preferably developed as recesses or as depressions in the side wall and/or the further side wall of the carrier element. Especially preferably, the form-lock elements of the side wall and/or the further side wall are developed as polygonal, especially rectangular, recesses. It is also possible that the form-lock elements of the side wall and/or the further side wall are developed as elongated holes, as round, oval or elliptical holes or as other recesses or depressions considered useful by one skilled in the art. It is also possible that the form-lock elements of the side wall and/or the further side wall are developed as recesses of different shapes. It is possible that the variation unit has one or more slide element(s).

In addition, a frame is provided, in particular a bicycle frame, which at least has a holding device according to the present invention. The frame preferably includes at least one elongated element, and especially preferably, the frame is completely made of elongated elements. An 'elongated element' in this context particularly should be understood as an element in which an imaginary cuboid, which is as small as possible and which just barely still manages to accommodate the element, has a length that amounts to at least five times, advantageously at least ten times, and most preferably, at least fifteen times the width and height of the cuboid. In particular, the frame may have at least one recess to accommodate the holding device, in particular the carrier element, and the accumulator. For example, the recess may be developed as a depression or a cavity of the frame. The at least partial positioning the holding element, in particular the carrier element, inside the cavity of the frame especially makes it possible to improve the optics of the frame in the state when the accumulator is installed on the carrier element, and/or to reduce a wall thickness of the frame, and/or to prevent the entry of dirt and/or fluid into the accumulator. The placement of the holding device and/or the carrier element inside the cavity is particularly advantageous in a development of the frame as a lightweight frame, e.g., a carbon frame.

In addition, it is provided that the frame includes a tubular frame element, which is meant to accommodate in its interior at least a large part of the holding device and at least a large part of an accumulator held with the aid of the holding device. This advantageously makes it possible to achieve a particularly compact storage of the accumulator. Moreover, a storage possibility for especially long accumulators, which thus have a high energy storage capacity, can advantageously be created. A 'large part' of a component in particular describes at least 30%, preferably at least 50%, and most preferably, at least 70% of the total volume of the component. The accumulator is preferably inserted along its longitudinal axis into the frame element. The carrier element particularly extends parallel to the frame element. More specifically, during the installation, the accumulator is inserted and guided along the carrier element until the accumulator makes contact with the stop element which is fixed in place on the carrier element. As an alternative, however, it is also possible that the accumulator is introduced into the interior of the frame element through a side opening of the frame element. It is also possible that the accumulator is radially installed on the carrier element if the accumulator is introduced via a side opening of the frame element.

The holding device according to the present invention and/or the frame according to the present invention is/are not meant to be restricted to the above-described use and embodiment. In particular, in order to achieve a method of functioning described herein, the holding device according to the present invention and/or the frame according to the present invention may have a number of individual elements, components and units that differs from the number mentioned herein. In addition, values lying within the mentioned limits of the value ranges indicated in this disclosure are also considered to be disclosed and usable as desired.

BRIEF DESCRIPTION OF THE DRAWINGS

Additional advantages result from the following description of the Figures. The figures show two exemplary embodiments of the present invention. The figures and the description include numerous features in combination. One skilled in the art will usefully also consider the features individually and combine them to form further meaningful combinations, in view of the disclosure herein.

DETAILED DESCRIPTION OF EXAMPLE EMBODIMENTS

Figure 1:
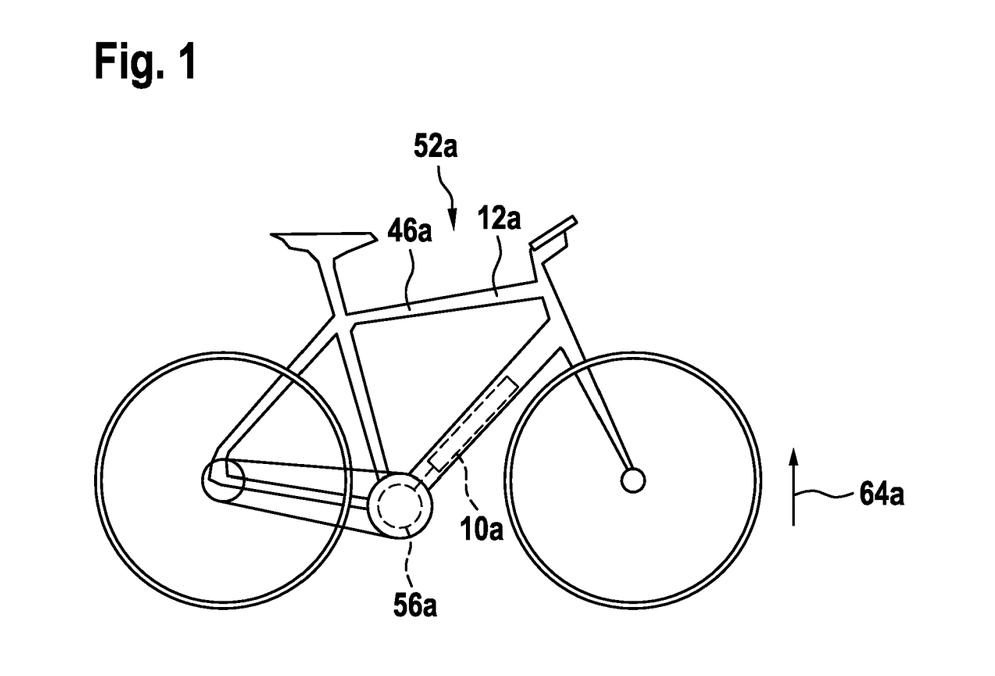
FIG. 1 shows a schematic representation of a bicycle having a frame according to an example embodiment of the present invention, in particular a bicycle frame.
Figure 2A:
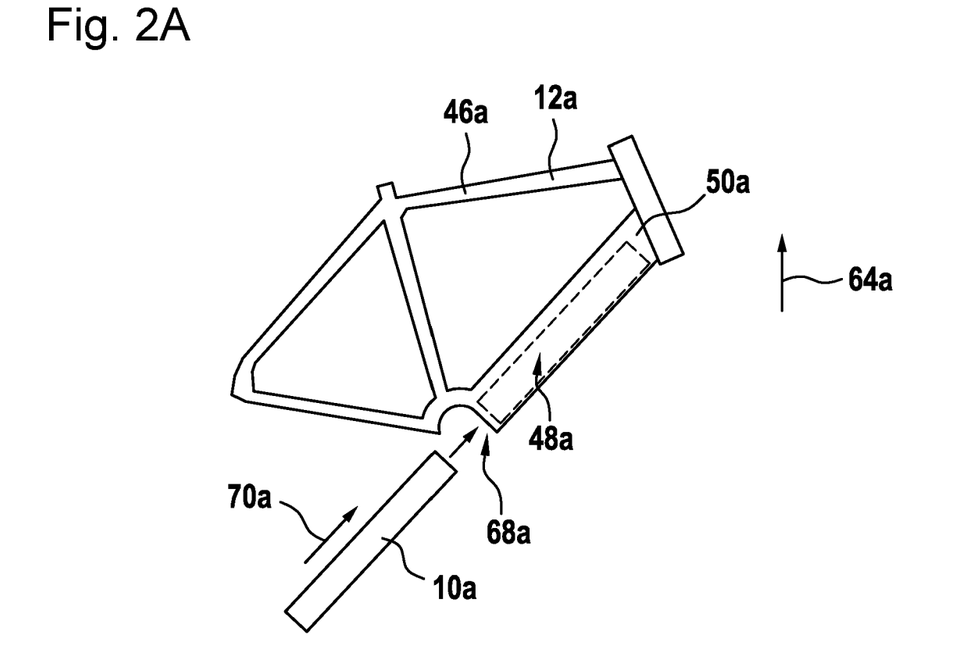
FIG. 2A shows a schematic representation of a first variant of the bicycle frame having a holding device according to the present invention and an accumulator.
Figure 2B:
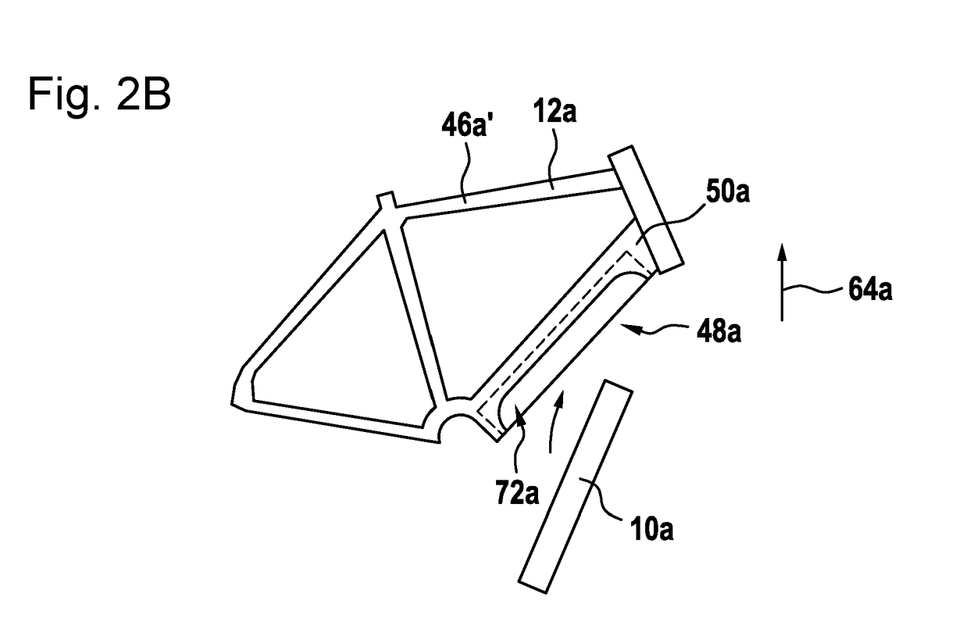
FIG. 2B shows a schematic representation of a second variant of the bicycle frame having a holding device according to the present invention and the accumulator.

FIG. 1 shows a bicycle 52a with an auxiliary motor 56a and an accumulator 10a. Bicycle 52a is embodied as a Pedelec or as an E-bike. Accumulator 10a is provided to supply electrical energy to auxiliary motor 56a. Bicycle 52a has a frame 12a which is developed as a bicycle frame 46a. FIG. 2A and FIG. 2B show two variants of bicycle frame 46a, 46a'. Bicycle frame 46a has a frame element 50a. Frame element 50a has a tubular development. Tubular frame element 50a has a round cross-section but alternatively could also have an oval or angular cross-section or some other cross-section of a different shape. Frame element 50a is developed as a lower tube of bicycle frame 46a, 46a'. Bicycle frame 46a, 46a' has a holding device 48a for releasably holding accumulator 10a on bicycle frame 46a, 46a'. Frame element 50a is provided to accommodate in its interior at least a large part of holding device 48a. Frame element 50a is provided to accommodate in its interior at least a large part of an accumulator 10a held with the aid of holding device 48a.

In the exemplary embodiment of bicycle frame 46a according to FIG. 2A, bicycle frame 46a has an opening 68a on an underside of frame element 50a. Accumulator 10a is inserted into the interior of frame element 50a through opening 68a along a longitudinal axis 70a of accumulator 10a. In the alternative exemplary embodiment of bicycle frame 46a according to FIG. 2B, bicycle frame 46a' has a side opening 72a on frame element 50a. Accumulator 10a is introduced, especially pivoted, through side opening 72a into the interior of frame element 50a. Viewed in an upright direction 64 of bicycle 52a, side opening 72a essentially points downward.

Figure 3:
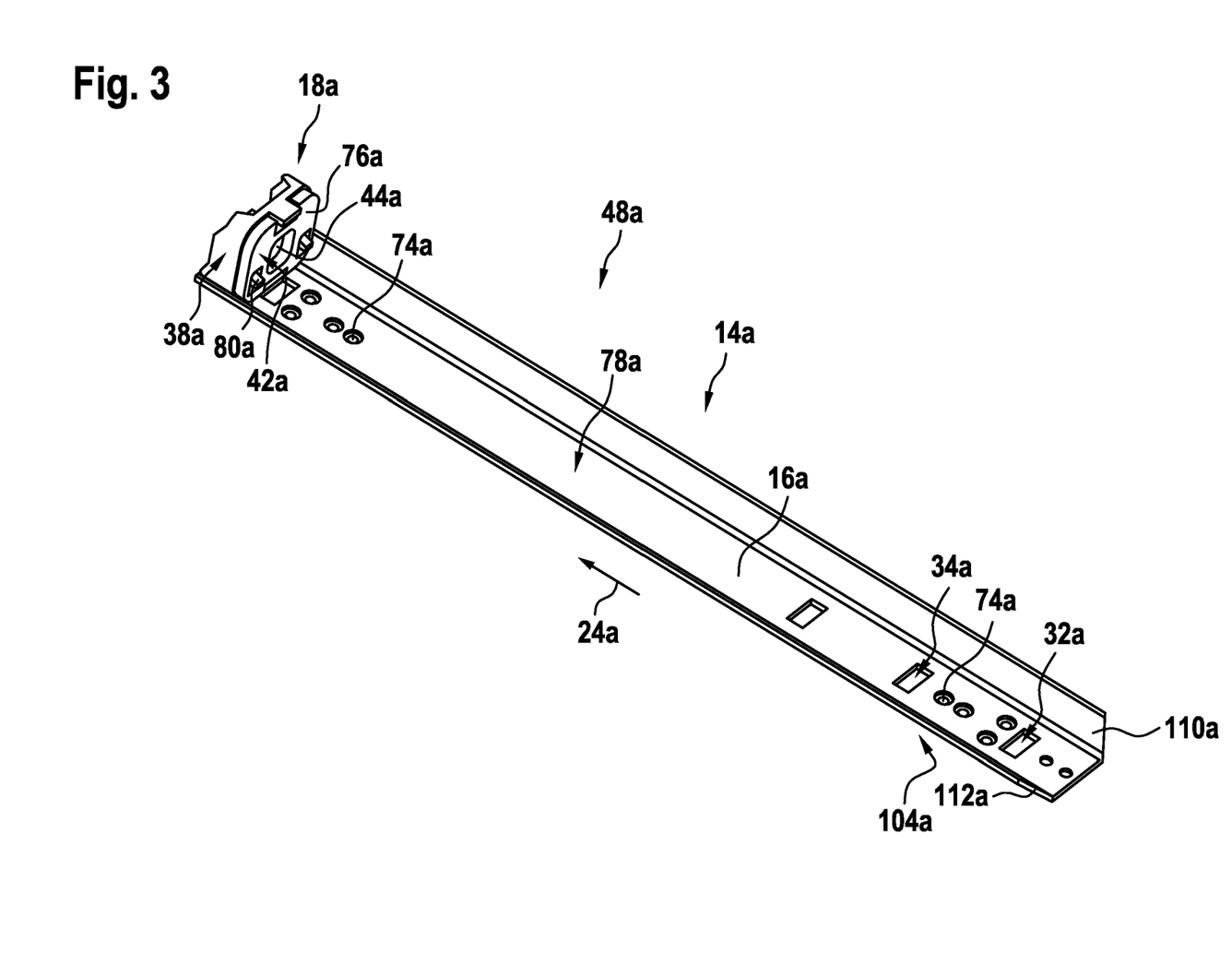
FIG. 3 shows a schematic representation of a part of the holding device according to an example embodiment of the present invention.

FIG. 3 shows part of holding device 48a. Holding device 48a is provided for releasably holding accumulator 10a on bicycle frame 46a. Holding device 48a includes a carrier unit 14a. Carrier unit 14a has a carrier element 16a. Carrier element 16a is embodied as a curved bent sheet metal part. Carrier element 16a preferably has a U-shaped cross-section, in particular when viewed in a sectional plane that extends perpendicular to a longitudinal axis 24a of carrier element 16a. Carrier element 16a forms a guide rail for guiding accumulator 10a. Carrier element 16a has a longitudinal axis 24a. Carrier element 16a developed as a guide rail guides accumulator 10a along longitudinal axis 24a. Carrier element 16a has a receiving region 78a for accumulator 10a. Accumulator 10a is situated, in particular clamped, in receiving region 78a of carrier element 16a at least in a clamped operating state 22a of holding device 48a (see FIG. 7A). Situated on carrier element 16a of holding device 48a is a variation unit 104a, which is provided for a variable positioning of a locking unit 106a in different positions of carrier element 16a, especially when viewed along a longitudinal axis 24a of carrier element 16a. Variation unit 104a has at least two form-lock elements 32a, 34a, which are situated along longitudinal axis 24 of carrier element 16. Form-lock elements 32a, 34a are situated in stop unit 18 at different distances from carrier element 16 along longitudinal axis 24. Form-lock elements 32a, 34a are embodied as rectangular recesses in carrier element 16a. Form-lock elements 32a, 34a are particularly provided to establish a form lock with at least a part of locking unit 106a in an operating state 22a. Carrier element 16a has fastening elements 74a. Fastening elements 74a are embodied as recesses. Carrier element 16a is able to be fixed in place on bicycle frame 46a with the aid of fastening elements 74a. Carrier element 16a has a side wall 110a, which is angled relative to a main extension plane of carrier element 16a. Carrier element 16a has a further side wall 112a, which is angled relative to the main extension plane of carrier element 16a. Variation unit 104a is disposed between side wall 110a and 112a. It is also possible that variation unit 104a is at least partly situated on side wall 110a and/or on further side wall 112a.

Holding device 48a has a stop unit 18a. At least in a fixed state, stop unit 18a is firmly connected to carrier unit 14a, in particular to carrier element 16a, especially with the aid of variation unit 104a. With the aid of variation unit 104a disposed on carrier element 16a, stop unit 18a is preferably able to be placed at different positions on carrier element 16a, in particular with the aid of form-lock elements 32a, 34a. Stop unit 18a includes a spring device 38a. Stop unit 18a has a stop part 76a. Spring device 38a is provided to preload stop part 76a. Spring device 38a contributes to a clamping force holding accumulator 10a. Spring device 38a pushes stop part 76a in a direction extending parallel to longitudinal axis 24a and pointing toward receiving region 78a of carrier element 16a. Stop unit 18a includes a plug element 44a. Plug element 44a provides for the electrical contacting of accumulator 10a introduced into receiving region 78a. Plug element 44a is situated on a side 42a of stop unit 18a facing receiving region 78a. In a clamped operating state 22a, plug element 44a is situated on side 42a facing a clamping unit 20a of locking unit 106a. Stop unit 18a includes fit elements 80a. Fit elements 80a are provided to engage with corresponding recesses (not shown) of accumulator 10a. This makes it possible to achieve advantageous holding of accumulator 10a and/or to prevent clamping a wrong accumulator 10a into receiving region 78a, which consequently may prevent damage to plug element 44a as much as possible.

Figure 4:
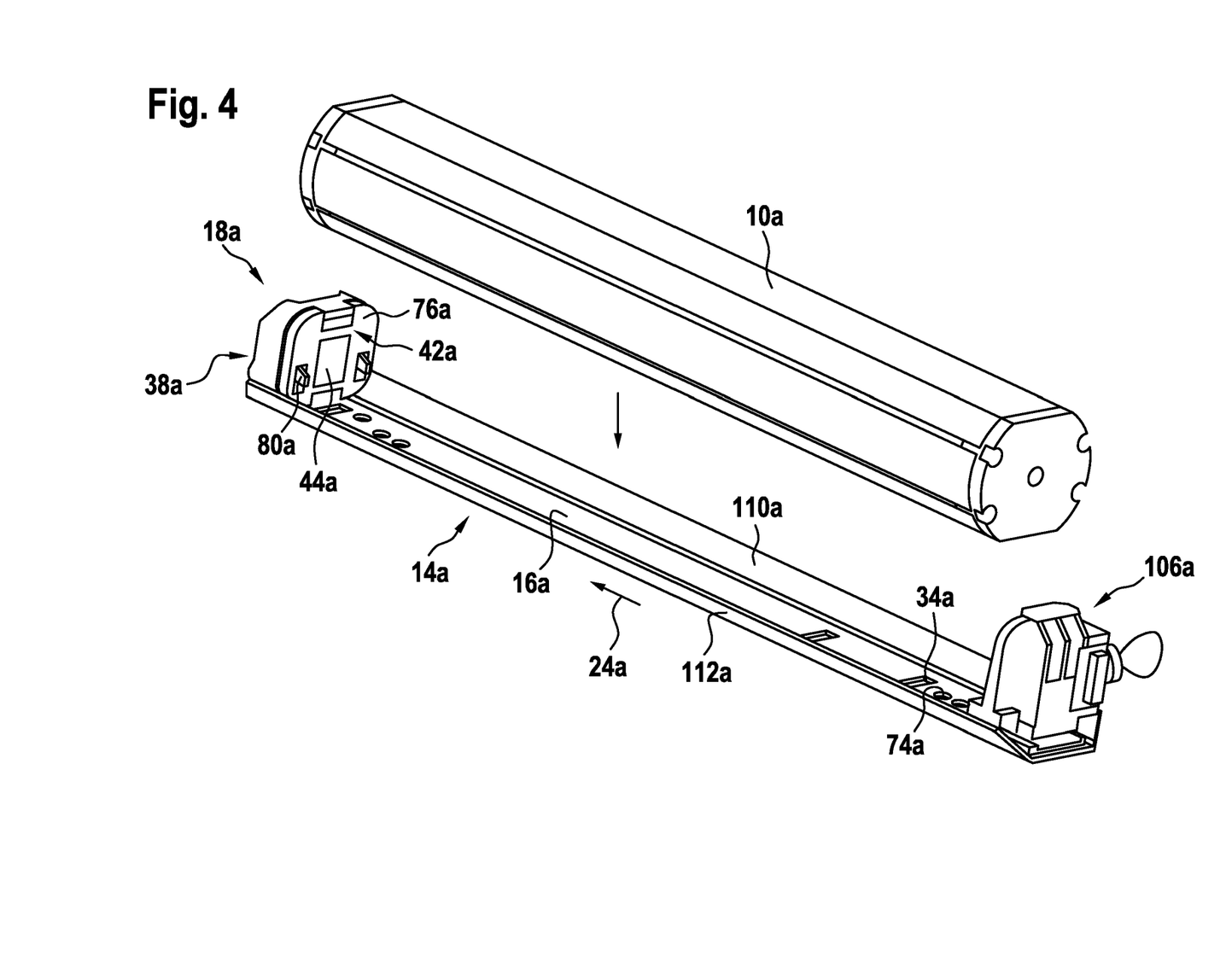
FIG. 4 shows a schematic representation of the holding device according to an example embodiment of the present invention including a locking unit and an accumulator for a radial installation of the accumulator on the holding device according to an example embodiment of the present invention.

FIG. 4 shows a schematic representation of holding device 48a with locking unit 106a disposed on carrier unit 14a for the radial installation of an accumulator 10a on holding device 48a. Locking unit 106a is preferably situated at a position of carrier element 16a. More particularly, locking unit 106a is disposed at a position on carrier element 16a with the aid of variation unit 104a. Locking unit 106a preferably includes form-lock elements, which correspond to form-lock elements 32a, 34a and are able to engage with form-lock elements 32a, 34a for a fixation. It is possible that a clamping unit 20a similar to clamping unit 20b of locking device 106b is used to fix locking unit 106a in position on carrier element 16a. After locking unit 106a has been positioned on carrier element 16a, accumulator 10a may be radially slipped on and fixed in place on carrier element 16a with the aid of locking unit 106a. More particularly, accumulator 10a is fixed in place on carrier element 16a by latch elements, clamping elements or other fastening elements and disposed on locking device 106a.

Figure 5:
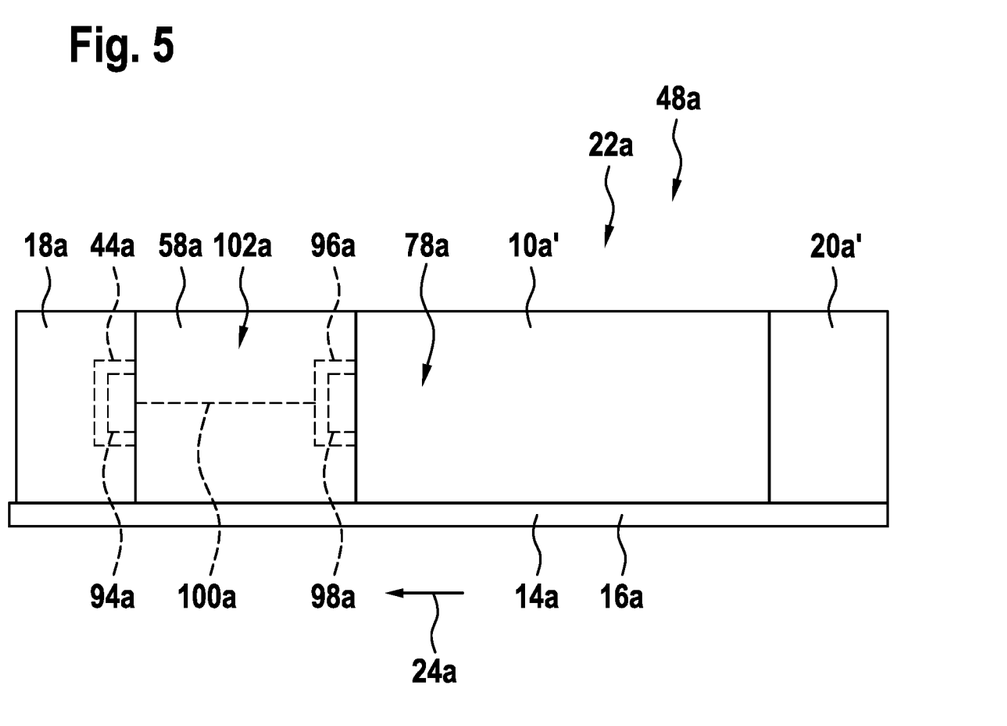
FIG. 5 shows a schematic side view of the holding device according to an example embodiment of the present invention having an alternative accumulator.

FIG. 5 shows a side view of holding device 48a with an alternative accumulator 10a'. Alternative accumulator 10a' is shorter than the above-described accumulator 10a. Viewed along longitudinal axis 24a, alternative accumulator 10a' is shorter than receiving region 78a. In addition, FIG. 5 shows an alternative clamping unit 20a'. Alternative clamping unit 20a' is firmly connected to carrier element 16a. Alternative clamping unit 20a' is developed separately from alternative accumulator 10a'. Holding device 48a has an adapter element 58a. Adapter element 58a is provided to fill a gap 102a created between stop unit 18a and alternative accumulator 10a'. Adapter element 58a has a longitudinal extension that corresponds to the longitudinal extension of gap 102a. On two opposite sides, adapter element 58a has at least one plug element 94a, 96a. First plug element 94a of adapter element 58a is provided for a connection to plug element 44a of stop unit 18a. Second plug element 96a of adapter element 58a is provided for a connection to a plug element 98a of alternative accumulator 10a'. An electrical line 100a connects plug elements 94a, 96a of adapter element 58a to one another. Adapter element 58a is through-contacted.

FIGS. 6 to 10 show a further exemplary embodiment of the present invention. The following descriptions and the drawings are essentially limited to the differences between the exemplary embodiments; as far as similarly denoted components are concerned, especially components that bear similar reference numerals, reference may basically also be made to the drawings and/or the description of the other exemplary embodiments, in particular of FIGS. 1 through 5. To distinguish the exemplary embodiments, the letter a was appended to the reference numerals of the exemplary embodiment in FIGS. 1 through 5. In the exemplary embodiments of FIGS. 6 through 10, the letter a has been replaced by letter b.

Figure 6:
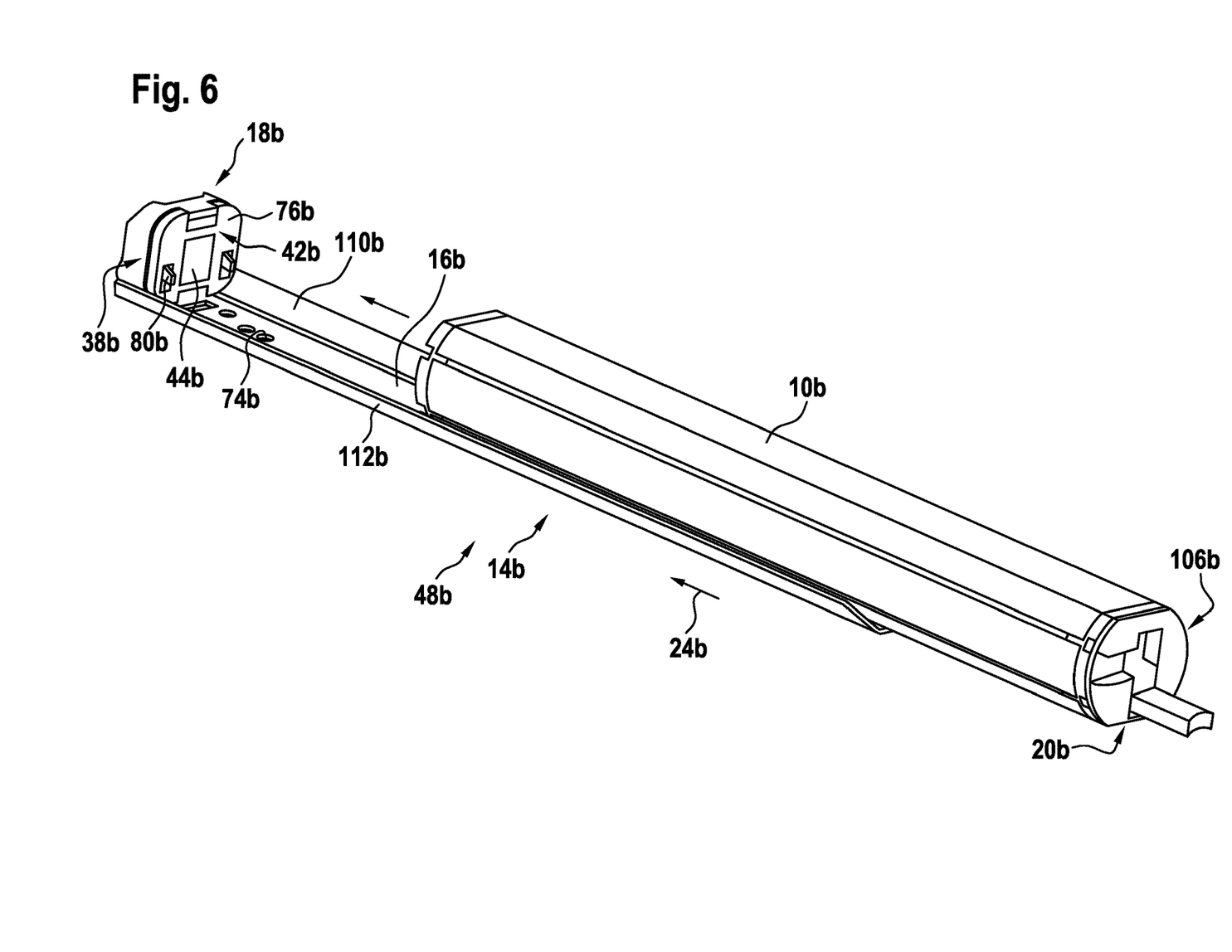
FIG. 6 shows a schematic representation of an alternative holding device according to an example embodiment of the present invention, which has a locking unit and an accumulator for an axial installation of the accumulator on the alternative holding device according to the present invention.

FIG. 6 shows a schematic representation of a holding device 48b having a locking unit 106b situated on an accumulator 10b for the axial installation of accumulator 10b on holding device 48b. Accumulator 10b includes a clamping unit 20b, which is provided to position locking unit 106b on a variation unit 104b, which is disposed on a carrier element 16b of carrier unit 14b. In an axial installation, accumulator 10b is slipped onto carrier element 16b along a longitudinal axis 24b and in the process is at least partially guided by side walls 110b, 112b until accumulator 10b makes contact with a stop unit 18b. In this position, clamping unit 20b is able to be brought from an unclamped state to a clamped operating state 22b for fixing accumulator 10b in place on carrier element 16b.

Figure 7A:
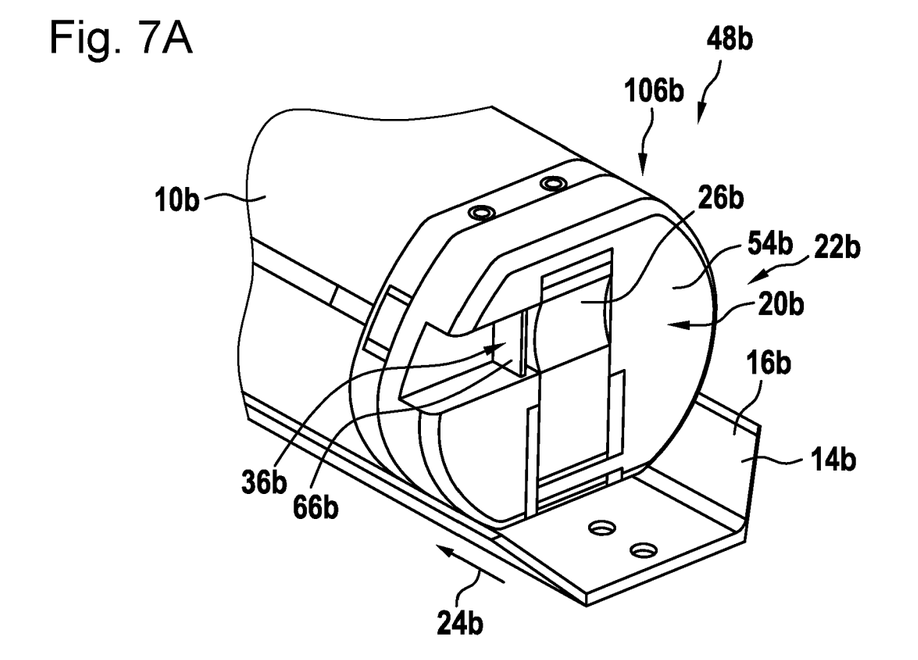
FIG. 7A shows a schematic representation of a further part of the alternative holding device according to an example embodiment of the present invention having a clamping unit, in a clamped operating state.

FIG. 7A shows a further part of holding device 48b in clamped operating state 22b with accumulator 10b and locking unit 106b. Locking unit 106b includes clamping unit 20b. Clamping unit 20b is designed to fix accumulator 10b in position on carrier unit 14b in clamped operating state 22b. Clamping unit 20b is provided to clamp accumulator 10b between clamping unit 20b and stop unit 18b in an operating position in such a way that clamping unit 20b exerts a pressure force on accumulator 10b in a clamped operating state 22b, the pressure force acting in the direction of stop unit 18b on accumulator 10b. The pressure force exerted by clamping unit 20b in clamped operating state 22b acts in parallel with longitudinal axis 24b of carrier element 16. In clamped operating state 22b, a spring device 38b shown in FIG. 6 generates a spring force that counteracts the clamping force of clamping unit 20b. Clamping unit 20b is firmly connected to accumulator 10b. Clamping unit 20b is installed on accumulator 10b. Clamping unit 20b is provided with a housing 54b. Housing 54b seals clamping unit 20b from the outside at least on a side facing away from accumulator 10b. Clamping unit 20b includes an operating element 26b. Operating element 26b is developed as a toggle lever. Operating element 26b is designed so that no tool is required for its operation. Clamping unit 20b has a locking device 36b. Locking device 36b secures operating element 26b in clamped operating state 22b. Locking device 36b includes a further operating element 66b. Further operating element 66b is developed as a push button. Further operating element 66b is provided to at least release the safety mechanism of locking device 36b when operated. In the closed state, i.e., in clamped operating state 22b, operating element 26b is flush with a front side of clamping unit 20b, especially with housing 54b of clamping unit 20b. This advantageously makes it possible to exclude an undesired manipulation (e.g., theft). Moreover, an operator of operating element 26b may advantageously be given a clear indication that operating element 26b and thus accumulator 10b is correctly fixed.

Figure 7B:
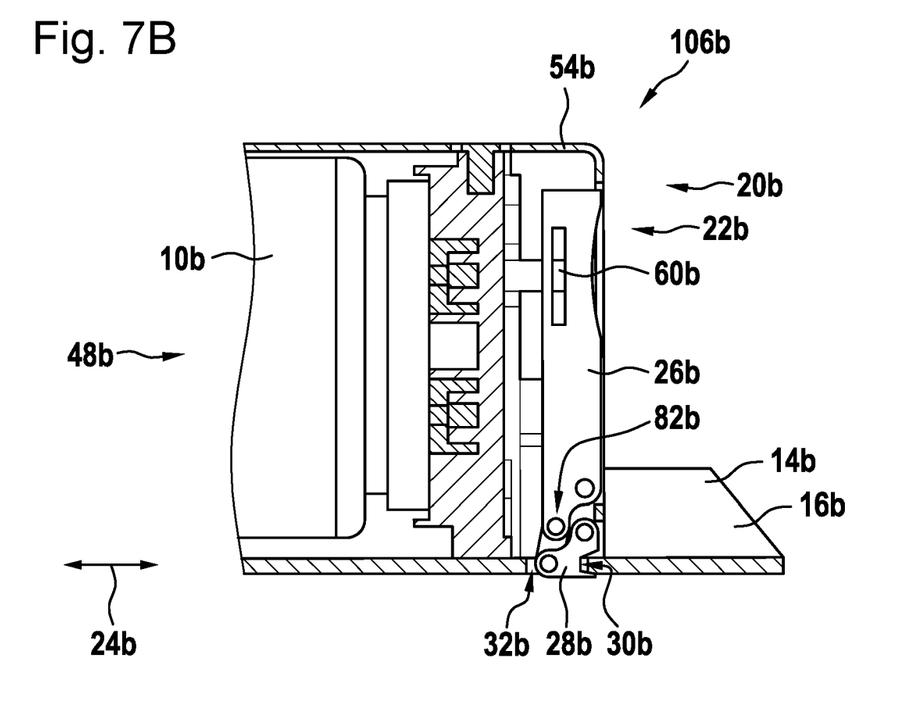
FIG. 7B shows a schematic representation of a perpendicular section of the further part of the alternative holding device according to an example embodiment the present invention from FIG. 7A.

FIG. 7B shows a perpendicular section through the further part of holding device 48b from FIG. 7A. Clamping unit 20b of locking unit 106b has a clamping element 28b. Clamping unit 20b has a knee lever 82b. Operating element 26b forms a leg of knee lever 82b. Clamping element 28b forms a further leg of knee lever 82b. Pivoting of operating element 26b causes pivoting of clamping element 28b. Clamping element 28b is provided to support at least a large share of the occurring pressure force on carrier element 16b in clamped operating state 22b. Alternatively, in clamped operating state 22b, clamping element 28b may be designed to support the pressure force directly at frame 12b. Clamping element 28b has a form-lock element 30b. Form-lock element 30b is developed in the form of a claw. Clamping unit 20b is provided to maintain the pressure force in clamped operating state 22b. Variation unit 104b of carrier element 16b has corresponding form-lock elements 32b, 34b. Corresponding form-lock elements 32b, 34b are provided to engage with clamping element 28b of clamping unit 20b in order to establish clamped operating state 22b. Corresponding form-lock elements 32b, 34b are developed as recesses in carrier element 16b. In clamped operating state 22b, the claw-type form-lock element 30b engages with a corresponding form-lock element 32b, 34b and doing so, digs into corresponding form-lock element 32b, 34b. Because of the knee lever geometry of knee lever 82b, clamping unit 20b is pushed in the direction of accumulator 10b when operating element 26b is closed. Similar to variation unit 104a from FIG. 3, variation unit 104b of holding device 48b has multiple corresponding form-lock elements 32b, 34b. The different corresponding form-lock elements 32b, 34b, are situated at different distances from stop unit 18b along longitudinal axis 24b of carrier element 16b. The different corresponding form-lock elements 32b, 34b allow for the installation of accumulators 10b of different lengths.

Figure 8A:
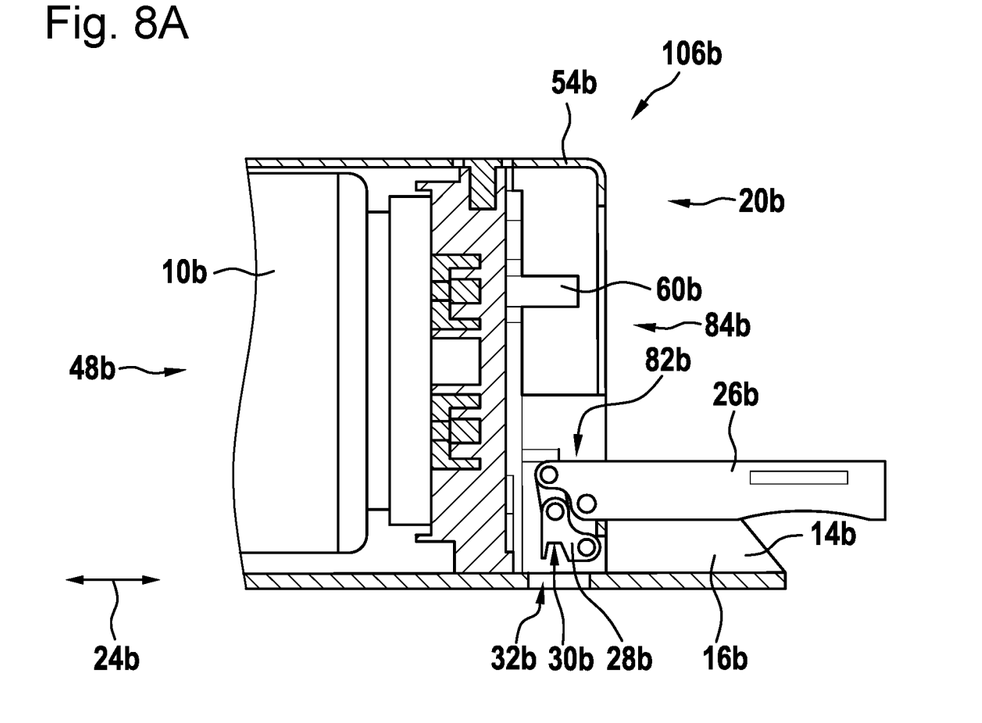
FIG. 8A shows a schematic representation of the further part of the alternative holding device according to an example embodiment of the present invention having the clamping unit, in an unclamped state.
Figure 8B:
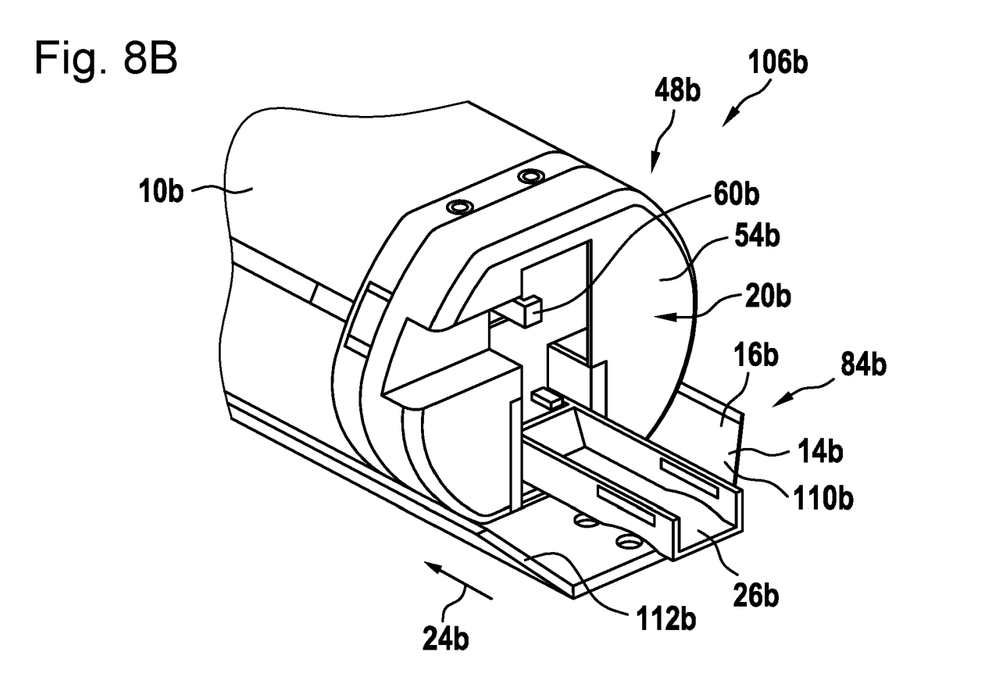
FIG. 8B shows a schematic representation of a perpendicular section of the further part of the alternative holding device according to an example embodiment of the present invention from FIG. 7A.

FIGS. 8a and 8b show the part of holding device 48b with locking unit 106b in an unclamped operating state 84b. Operating element 26b is completely swung outward. Because of the knee lever geometry, clamping element 28b is swung out of corresponding form-lock element 32b, 34b of variation unit 104b of carrier unit 14b. Operating element 26b and clamping element 28b are free of contact with carrier unit 14b. Accumulator 10b with locking unit 106b, which has clamping unit 20b, is able to be removed from receiving region 78b along longitudinal axis 24b of carrier element 16b in unclamped operating state 84b. In an unclamped operating state 84b, operating element 26b forms a grip element, in particular a pull tab. For the sake of clarity, parts of locking device 36 have been omitted in FIGS. 7a and 7b.

Figure 9:
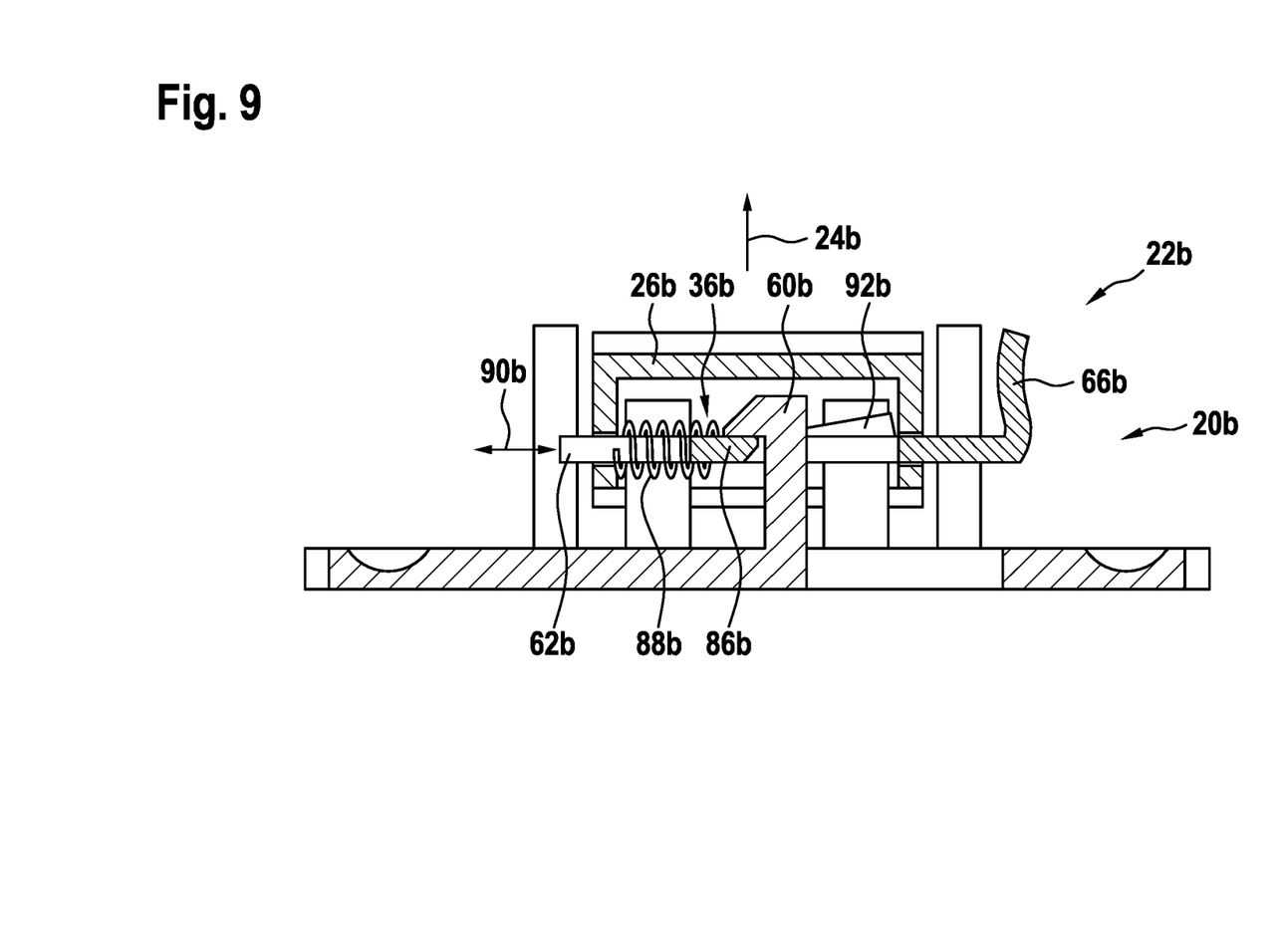
FIG. 9 shows a schematic representation of a horizontal section through a part of the clamping unit having a locking device, according to an example embodiment of the present invention.
Figure 10:
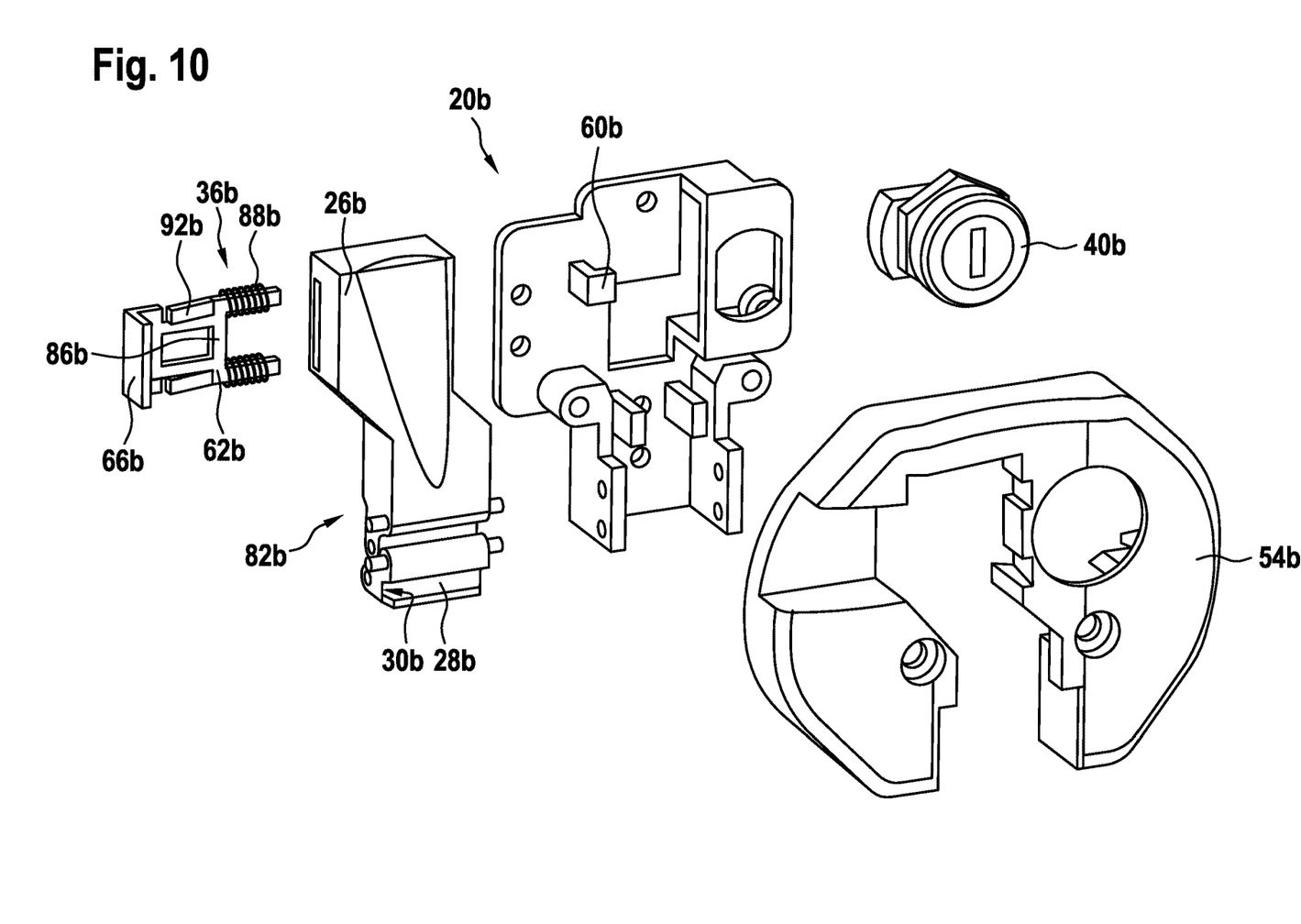
FIG. 10 shows a schematic exploded representation of a part of the clamping unit, accordance with an example embodiment of the present invention.

FIG. 9 shows a horizontal section through a part of clamping unit 20b of locking unit 106b with locking device 36b. In the position illustrated in FIG. 9, locking device 36b secures operating element 26b in clamped operating state 22b. Locking device 36b has a latch element 60b. Latch element 60b is embodied as a latch hook. Locking device 36b has a locking element 62b. Locking element 62b is inserted into operating element 26b. Locking element 62b has further operating element 66b. Locking element 62b has a mating piece 86b. In clamped operating state 22b secured by locking device 36b, mating piece 86b rests against the latch hook. Locking element 62b is latched together with the latch hook via mating piece 86b. The latching of mating piece 86b of locking element 62b with the latch hook prevents a movement of operating element 26b connected to locking element 62b at least in a pivot direction of operating element 26b, in particular in a direction parallel to longitudinal axis 24b of carrier element 16b. Locking device 36b has a spring element 88b. Spring element 88b mounts locking element 62b relative to operating element 26b. Via spring element 88b, locking element 62b is supported on operating element 26b in the direction of an operating direction 90b of locking element 62b, in particular of further operating element 66b. Through pressure on further operating element 66b, spring element 88b is compressed and mating piece 86b is removed from the engagement with latch element 60b. As a result, spring device 38b of stop unit 18b pushes accumulator 10b a certain distance out of receiving region 78b. This causes operating element 26b to be slightly pivoted so that no new latching of locking element 62b with latch element 60b is able to take place any longer. Accumulator 10b is thereby released and able to be removed from receiving region 78b along longitudinal axis 24b. Locking element 62b has a positioning element 92b. Positioning element 92b is provided to prevent a release of locking element 62b by operating element 26b. In addition, positioning element 92b restricts a maximum expansion of spring element 88b. FIG. 10 shows an exploded view of a part of clamping unit 20b. In contrast to FIGS. 6 through 9, individual parts of clamping unit 20b shown in FIG. 10 have slightly deviating shapes, but the functions are in essence identical. Components that have the same denotations or reference numerals in the following description and drawing correspond to the above-mentioned components and assume their functions. In addition to the embodiment of FIG. 6 through 9, holding device 48b from FIG. 10 has a lock 40b. Lock 40b is provided to lock and/or unlock clamping unit 20b. Lock 40b is integrated into housing 54b of clamping unit 20b.

What is claimed is:

1. A holding device for releasably holding an accumulator on a frame, comprising:
   a carrier unit provided with at least a carrier element, configured to at least partially accommodate and/or guide the accumulator; and
   at least one variation unit, situated at least partially on the carrier element, configured to variably position at least two locking units at different positions,
   wherein a first locking unit is configured for the radial installation of an accumulator and wherein a second locking unit is configured for the axial installation of the accumulator.

2. The holding device as recited in claim 1, wherein the accumulator is a bicycle accumulator, and the frame is a bicycle frame.

3. The holding device as recited in claim 1, wherein the carrier element is a guide rail.

4. The holding device as recited in claim 1, wherein the variation unit includes at least two form-lock elements configured for a variable placement of the locking unit at different positions of the carrier element viewed along the longitudinal axis of the carrier element.

5. The holding device as recited in claim 4, wherein the at least two form-lock elements are situated at different distances from a stop unit situated at an end of the carrier element along the longitudinal axis of the carrier element.

6. The holding device as recited in claim 1, further comprising the locking unit situated on the carrier unit in a variable manner using the variation unit, the locking unit being configured to releasably fasten the accumulator to the carrier unit.

7. The holding device as recited in claim 6, further comprising the accumulator, the accumulator having the locking unit configured to releasably fastening of the accumulator to the variation unit disposed on the carrier element.

8. A holding device, comprising:
   a carrier unit provided with at least a carrier element, configured to at least partially accommodate and/or guide the accumulator; and
   at least one variation unit, situated at least partially on the carrier element, configured to variably position a locking unit at different positions of the carrier element viewed along a longitudinal axis of the carrier element,
   wherein the carrier element has at least one side wall, which is curved or angled relative to a main extension plane of the carrier element and at least partially covers the accumulator laterally at least in a state when it is situated on the carrier unit.

9. The holding device as recited in claim 1, wherein the carrier element has at least one side wall, which is curved or angled relative to a main extension plane of the carrier element, and at least one further side wall, which is curved or angled relative to the main extension plane of the carrier element, the variation unit being situated at least in a region between the side wall and the further side wall.

10. The holding device as recited in claim 1, wherein the carrier element has at least one side wall, which is curved or angled relative to a main extension plane of the carrier element, and at least one further side wall, which is curved or angled relative to the main extension plane of the carrier element, the variation unit being at least partially situated on the side wall and/or on the further side wall.

11. A frame, comprising a holding device for releasably holding an accumulator on the frame, the holding device including:
- a carrier unit provided with at least a carrier element, configured to at least partially accommodate and/or guide the accumulator; and
- at least one variation unit, situated at least partially on the carrier element, configured to variably position at least two locking units at different positions,
- wherein a first locking unit is configured for the radial installation of an accumulator and wherein a second locking unit is configured for the axial installation of the accumulator.

12. The frame as recited in claim 11, wherein the frame is a bicycle frame.

13. The frame as recited in claim 11, further comprising a tubular frame element configured to accommodate in its interior at least a large part of the holding device and at least a large part of the accumulator held using the holding device.

\* \* \* \* \*